United States Patent Office 3,779,967
Patented Dec. 18, 1973

3,779,967
STORAGE STABLE CONCENTRATED AQUEOUS EMULSIONS PREPARED FROM A MIXTURE OF METHYLHYDROGEN SILOXANE AND METHYL POLYSILOXANE, AN AMINATED POLYMER AND AN EPOXY COMPOUND
Michel Camp, Lyons, France, assignor to
Rhone-Poulenc S.A., Paris, France
No Drawing. Filed Sept. 28, 1970, Ser. No. 76,325
Claims priority, application France, Sept. 29, 1969,
6933126
Int. Cl. C08g 47/10; C08j 1/46
U.S. Cl. 260—29.2 M                10 Claims

ABSTRACT OF THE DISCLOSURE

Storage-stable aqueous emulsions containing less than 80% water contain a methylhydrogenopolysiloxane/methylpolysiloxane mixture, an emulsifier and 1.5 to 30%, based on the weight of polysiloxane, of a curable reaction product of (a) an aminated polymer having repeat units —NR—$(C_nH_{2n}NR)_x$—A— where R is H or $C_1$-$C_4$ alkyl, $n > 2$, $x = 1$-$7$ and A=—CO—, —CS—, —CO—Q— or —CO—Q'—CO— where Q=$C_2$-$C_6$ alkylene and Q'=a divalent radical; and (b) a compound having at least one halohydrin or epihalohydrin group or at least two ethylene oxide groups. Dilution of the emulsion and addition of convention catalysts gives a bath suitable for waterproofing textiles in a manner resistant to repeated rubbing and washing.

---

The present invention relates to storage-stable concentrated aqueous emulsions based on organopolysiloxane polymers and water-soluble curable organic condensates which can be used for waterproofing textile materials.

Aqueous emulsions of dimethylpolysiloxane polymers and methylhydrogenopolysiloxane polymers which can be used for waterproofing fabrics are described in French patent specification No. 1,025,150. It is also known from French patent specifications Nos. 1,279,517, 1,395,051 and 1,402,269 that the wash resistance of such waterproof finishes can be improved by incorporating into these emulsions organic polymers such as reaction products of polyepoxide resins with polyamines. These compositions effectively permit better preservation of the waterproof character in the face of repeated washings and rubbings, but this preservation is insufficient to satisfy the users of garments and fabrics waterproofed by means of this type of emulsion. It is also known that it is advantageous to prepare concentrated emulsions, that is to say in which the water does not represent more than 80% of the total weight of the emulsion; in effect, on the one hand the storage stability of excessively dilute emulsions is unsatisfactory (French Pat. 1,402,269) while on the other hand it is of no value to store and manipulate large quantities of water.

New concentrated and storage-stable aqueous emulsions based on organopolysiloxanes have now been discovered which give the textiles a highly waterproof character which is resistant to repeated rubbings and washings.

The present invention provides storage-stable aqueous emulsions containing less than 80% of water and in which the solids content comprises a mixture of methylhydrogenopolysiloxane and methylpolysiloxane, and 0.1 to 10% by weight based on the weight of the polysiloxane mixture of an emulsifier, and 1.5 to 30% by weight based on the weight of the polysiloxane mixture of a curable water-soluble condensate which is a reaction product of an aminated polymer containing chains of formula:

—NR—$(C_nN_{2n}NR)_x$—A—  (IV)

in which R represents hydrogen or an alkyl group of 1 to 4 carbon atoms, $n$ is equal to or greater than 2, $x$ is between 1 and 7, the various symbols R of the groups $C_nH_{2n}NR$ can be identical or different if $x$ is greater than 1, and A represents a divalent radical of formula —CO—, —CS—, —CO—Q— or —CO—Q'—CO, where Q represents an alkylene radical having 2 to 6 carbon atoms and Q' represents a linear or branched, saturated or unsaturated, divalent organic radical; and a compound containing at least one halohydrin or epihalohydrin group or at least two groups of formula

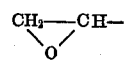

The aminated polymers can be polyamides or polyamide-polyamines (in this case A represents a —CO—Q— or —CO—Q'—CO— radical), polyaminoureylenes (in this case A represents a —CO— radical), or polyaminothioureylenes (in which case A represents a —CS— radical).

The polymers in which A is a radical of formula —CO—Q'—CO— can be obtained by reaction of organic diacids (or their anhydrides or their esters) with polyalkylene polyamines containing two primary amino groups and at least one secondary or tertiary amino group, such as diethylenetriamine, triethylenetetramine, tetraethylenepentamine and methylbis(3-aminopropyl) amine. The organic diacid may be a saturated or unsaturated aliphatic diacid having 3 to 10 carbon atoms, such as adipic, succinic, glutaric, azelaic, maleic, fumaric, citraconic, mesaconic or itaconic acids. Other organic diacids which may be used are diglycollic acid, the acid produced by the reaction of itaconic acid with an alkylenediamine or arylenediamine or mixtures of saturated aliphatic diacids with dimersised fatty acids or with aminoacids or lactams.

The polymers in which A is a radical of formula —CO—Q— may be obtained by reaction of α,β-unsaturated aliphatic carboxylic acids or their esters with polyalkylene-polyamines.

The polymers in which A is a radical of formula —CO— or —CS— may be obtained by reaction of urea or thiourea with a polyamine containing at least three amino groups, at least one of these groups being tertiary.

The preferred condensates are those obtained from a polymer of Formula IV in which $n$ is between 2 and 10 and A represents a radical of formula

—CO—Q'—CO— in which Q' is an alkylene radical containing 2 to 8 carbon atoms, a cycloalkylene radical with 5 or 6 carbon atoms, or a phenylene radical. The reaction product of such polymers with epichlorhydrin is particularly useful in the emulsions of the invention.

The above-mentioned aminated polymers are treated, in solution in water, with a compound containing at least one halohydrin or epihalohydrin group or at least two

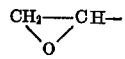

groups. Preferably, epichlorhydrin in used and this can optionally be combined with alkylating agents (which convert the tertiary amino groups into quaternary groups) such as dimethyl sulphate, methyl iodide or stabilisers such as formaldehyde.

Examples of halohydrins which can be used, include olefine chlorhydrins or bromhydrins, such as ethylene, propylene or butylene chlorhydrins and bromhydrins. Examples of compounds containing

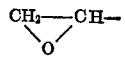

groups include the diglycidyl esters of ethylene glycol or of glycerine.

To prepare the condensates, it is desirable to use a sufficient amount of the treatment agent described above to convert all the secondary amino groups into tertiary amino groups and/or quaternary amino groups. In general, from 0.5 to 1.8 mol of the treatment agent is used per amino group of the polymer.

The aqueous solutions of these modified polymers are thereafter advantageously adjusted to an acid pH to stabilise them; they are used as such, or diluted, if necessary, by adding water so as to contain, in most cases, 5 to 25% by weight of solids. The preparation of these solutions of curable condensates is described in numerous patent specifications such as British patent specifications Nos. 979,461 and 1,051,579, French patent specification No. 1,407,935, U.S. patent specifications Nos. 2,926,116, 2,926,154, 3,125,552, 3,144,380, 3,197,427, 3,227,671, 3,240,664, 3,240,761, 3,248,280, 3,250,664, 3,259,600, 3,311,594, 3,305,493 and 3,320,215, and Netherlands patent specification No. 6813708.

The amount of curable condensate present in preferably between 5 and 15% by weight based on the weight of the polysiloxane mixture.

The methylhydrogenopolysiloxane can be represented by the Formula I

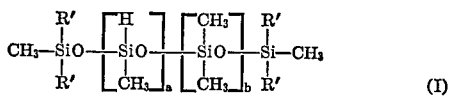

(I)

in which the symbols R', which may be identical or different, represent a methyl group or hydrogen, $a$ represents an integer from 3 to 600 and $b$ is zero or represents an integer from 1 to 200.

Examples of such polysiloxanes are the polymers of formulae:

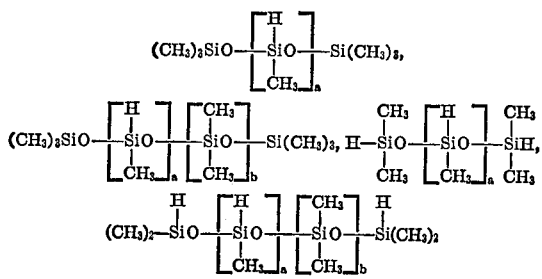

and

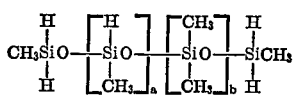

in which $a$ and $b$ are such that their viscosity is between 2 and 5000 cst. at 20°.

The preparation of these polymers is described in French patent specifications Nos. 941,296, 943,752, 1,025,150 and 1,472,104.

The methylhydrogenopolysiloxane generally represents 25 to 80% of the total weight of polysiloxanes present in the emulsion.

The mehtylpolysiloxane can be chosen from polymers of general formula:

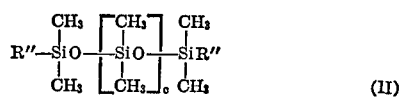
(II)

and those having repeat units of general formula:

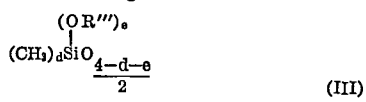
(III)

in which the symbols R'', which may be identical or different, represent a methyl or hydroxy group; R''' represents hydrogen and/or an alkyl radical having from 1 to 4 carbon atoms, C represents an integer from 5 to 15,000, $d$ is equal to 1, 2 or 3, the sum $d+e$ is between 1 and 3, and $e$ is zero or equal to 1; the polymers of units of Formula III on average contain 1.2 to 1.9 methyl radicals and 0 to 0.3 OR''' group per silicon atom.

The polymers of Formula II in particular comprise the oils and rubbers of formulae:

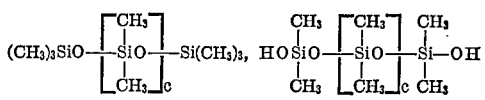

and

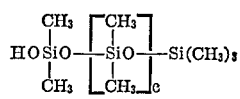

of which the viscosity can range from several centistokes to several millions of cst. at 25° C.; their preparation is described in French patent specifications Nos. 979,058, 1,025,150, 1,108,764, 1,188,495, 1,189,216, 1,134,005, 1,014,674, 1,226,745 and 1,370,884.

The resinous polymers having repeat units of Formula III may be solid or liquid products or solutions in the usual organic solvents. These polymers must contain trifunctional units such as:

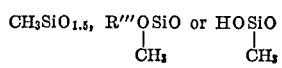

in addition to monofunctional and difunctional units such as:

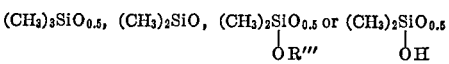

Their preparation is described in French patent specifications Nos. 950,681, 1,028,502, 1,165.540, 1,174,855 and 1,500,882.

The methylpolysiloxane, e.g. of Formulae II and III, generally represents 75 to 20% of the total weight of the polysiloxanes.

The aqueous emulsions of the invention are easily obtained using conventional emulsifiers chosen from amongst:

non-ionic agents such as the alkylphenyl monoethers of polyalkylene glycol, the reaction products of fatty alcohols or amides of fatty acids with ethylene oxide, and the various types of polyvinyl alcohols, or cationic agents such as the salts of aliphatic amines and the quaternary ammonium salts and pyridinium salts possessing long hydrocarbon chains, and the reaction products of fatty acids with N,N-dialkylamino alcohols.

The amount of emulsifier required is low and it is desirable to use the minimum amount required to obtain stable emulsions, that is to say about 0.1 to 10% by weight relative to the polysiloxanes.

For the reasons indicated above, the proportion of water in the emulsions is generally less than 80% relative to the total weight of the emulsions. It is generally between 20 and 80% by weight.

The waterproofing emulsions of the invention can be prepared by mixing the organosilicon polymers with the emulsifier, which can be in aqueous solution, by simple stirring, thereafter adding water if necessary, and converting the mixture into a fine and homogeneous emulsion, for example by passing it through a conventional colloid mill; finally, the aqueous solution of the curable condensate is introduced into the emulsion whilst stirring. A storage-stable emulsion is thus obtained which can be used subsequently for preparing fabric treatment baths easily. If organosilicon polymers of high molecular weight, such as resins having a ratio of $CH_3Si$ of between 1.2 and 1.6, are used, it may be necessary to use these polymers in the form of a solution in an inert hydrocarbon diluent such as toluene and xylene. In this case, 20 to 80% by weight of the diluent relative to the organosilicon polymer lead to rapid and efficient productions of emulsions.

In order to manufacture the fabric treatment baths, water and conventional catalysts based on organometallic salts and/or metal salts of carboxylic acids are added to the emulsions together with additional water. For example, salts of zinc or salts of di-n-butyl-tin or di-n-octyl-tin with aliphatic carboxylic acids such as the salts of acetic, propionic, hexanoic, 2-ethyl-hexanoic, octanoic, decanoic, lauric, myristic, palmitic, stearic and oleic acids can be used. Zinc hexanoate, 2-ethyl-hexanoate and octoate, and di-n-butyl-tin or di-n-octyl-tin dilaurate, diacetate and di(2-ethyl-hexanoate) are preferably used.

These salts are advantageously introduced in the form of an aqueous emulsion; in general, 5 to 20% by weight of these salts relative to the organosilicon polymers employed in the bath is suitable.

The treatment baths can contain varying concentrations of organosilicon polymers and of curable condensates, depending principally on the amount of water added. It is found to be preferably to prepare treatment baths containing 0.7 to 5% by weight of organosilicon polymers and 0.01 to 0.7% by weight of curable condensates. Such treatment baths form a further aspect of the present invention. The baths must be used for the treatment of the fabrics shortly after their preparation, if a partial cross-linking of organosilicon polymers, becoming more pronounced, is not to take place followed by deposition of solid resinous products.

The fabrics to be treated can be based on synthetic fibres such as those consisting of polyamide, polyester, polyacrylic compounds, polyethylene, polypropylene, polyvinyl chloride, cellulose acetate and the like, or based on natural fibres such as those of cotton, wool, linen, silk and jute. They are simply treated in accordance with a still further aspect of the present invention by padding at ambient temperature by passing them into a trough containing the waterproofing baths, thereafter drained so as to retain about 80 to 200 g. of the emulsion per 100 g. of fabric, and then dried for several hours at ambient temperature or several minutes at about 100–180° C. A thin layer of organosilicon polymers thus remains on the fabric; this layer generally represents from 1 to 3 g. per 100 g. of fabric depending on the concentration of the baths and the degree of draining. This layer, which is intimately linked to the cured cationic resin, forms a waterproof film on the surface of the fabric which withstands repeated washing and wear remarkably well.

The following examples are given to illustrate the present invention. Temperatures are in ° C.

EXAMPLE 1

An aqueous waterproofing emulsion $A_1$ is used which comprises:

|  | G. |
|---|---|
| A methylhydrogenopolysiloxane oil blocked by trimethylsiloxy units, of viscosity 20 cst. at 20° C. | 220 |
| A dimethylpolysiloxane oil blocked by trimethylsiloxy units, of viscosity 10,000 cst. at 20° C. | 180 |
| The aqueous solution, containing 9% by weight of solids, adjusted to pH 5, prepared according to Example 1 of U.S. patent specification No. 2,926,154, containing a polyamide prepared by reaction of diethylenetriamine with adipic acid and then modified with epichlorhydrin | 400 |
| A polyvinyl alcohol of saponification number 105, having a viscosity in 4% strength aqueous solution of about 25 cst. at 20° C. | 25 |
| Water | 175 |

This emulsion is prepared by mixing the organosilicon polymers with 200 g. of a 12.5% strength aqueous solution of polyvinyl alcohols, with stirring, thereafter passing the whole through a colloid mill so as to obtain a fine homogeneous emulsion, and adding 400 g. of the aqueous solution containing the modified polyamide, whilst continuing to stir.

For comparison, an emulsion A similar to $A_1$ in respect of its constitution and preparation is prepared, in which the 400 g. of the modified polyamide solution are replaced by 400 g. of water.

Two fabric treatment baths are then prepared by successively introducing 50 g. of concentrated emulsion A or $A_1$, followed by 940 g. of water and 10 g. of a catalyst emulsion C into a container equipped with a stirrer. The catalyst emulsion consists of:

|  | G. |
|---|---|
| Zinc 2-ethyl-hexanoate | 200 |
| n-Dibutyl-tin di(2-ethyl-hexanoate) | 50 |
| Toluene | 200 |
| Polyvinyl alcohol of saponification number 105, having a viscosity in 4% strength aqueous solution of about 25 cst. at 20° C. | 20 |
| Water | 530 |

This emulsion is prepared by mixing 200 g. of a 10% strength aqueous solution of polyvinyl alcohol with 350 g. of water, thereafter adding 450 g. of the toluene solution of the catalysts and then passing the whole through a colloid mill to obtain a stable emulsion.

The two treatment baths each contain 2% by weight of organopolysiloxane polymers, and additionally 0.18% by weight of modified polyamide in one and no modified polyamide in the other. They are then used to treat a cotton fabric by padding. This technique consists of immersing the fabric into the bath, impregnating it well, draining it so as to leave 100 g. of waterproofing solution per 100 g. of dry fabric and finally passing it for some minutes through an oven at 100° C. and then at 150° C. to remove the water, cure the waterproof coating and thus deposit 2% by weight of organosilicon polymers relative to the fabric. The treated cotton fabric is subjected to several successive washes in a horizontal drum washing machine, using a water-soap mixture heated to about 60° C.

After the waterproofing treatment and after each wash the waterproof character of the fabric is measured by means of the results of tests on the pluviometer carried out in accordance with ASTM standard specification No. D583–58 and tests on the porosimeter of the Bundesmann type carried out in accordance with the technique described in "Tentative Test No. 8," Journal of the Textile Institute, June 1955, volume 46, pages S51–S56 and in "The Bundesmann Test" pages 282–288 of "Waterproofing and Water Repellency" by J. L. Moilliet.

In the tests on the pluviometer, a certain volume of water drops from a given height in the form of rain onto a stretched fabric surface; thereafter the result obtained is evaluated with reference to a scale table. The ratings range from 0 to 100, corresponding for rating 0 to zero waterproofing and for rating 100 to perfect waterproofing.

In the tests on the porosimeter of the Bundesmann type samples receive water, in the form of artificial rain dropping from a height of 1.50 m., on one of their two faces for 10 minutes; during this treatment the face of the samples which is not exposed to the rain is subjected to a rubbing which essentially reproduces the rubbing movements of the fabric when it is worn. The percentage of water absorbed by the samples and the amount of water which has passed through the fabric is then measured: the higher the percentages and this amount are, the worse is the waterproofing. The results of these tests are given in Table I. Results obtained when untreated fabric is subjected to similar tests is given below the table. In Table I the symbol PL represents the pulviometer and PO the porosimeter; in the latter case the letter a relates to the percentage of water absorbed and the letter b to the amount of water in $cm.^3$ which has passed through the fabric.

TABLE I

| Nature of the treatment baths | Results after— | | | | | | | | | | | |
|---|---|---|---|---|---|---|---|---|---|---|---|---|
| | Treatment | | | 1st wash | | | 2d wash | | | 3d wash | | |
| | | PO | | | PO | | | PO | | | PO | |
| | PL | a, percent | b | PL | a, percent | b | PL | a, percent | b | PL | a, percent | b |
| Containing emulsion: | | | | | | | | | | | | |
| $A_1$ | 100 | 40 | 0 | 80 | 62 | 0 | 75 | 70 | 0 | 70 | 98 | 7 |
| A (for comparison) | 100 | 42 | 0 | 70 | 85 | 5 | 50 | 105 | 20 | 0 | 114 | 26 |

An untreated fabric absorbs 177% of water and it is found that 70 cm.³ of water have passed through the fabric. The pluviometer test gives this fabric the rating 0.

It is seen that the presence of curable condensates in the treatment baths markedly improves the retention of the waterporof finish on washing.

EXAMPLE 2

An aqueous waterproofing emulsion $B_1$ is used which comprises:

| | G. |
|---|---|
| A methylhydrogenopolysiloxane oil blocked with trimethylsiloxy units, of viscosity 20 cst. at 20° C. | 220 |
| A dimethylpolysiloxane oil blocked with trimethylsiloxy units of viscosity 1000 cst. at 20° C. | 180 |
| The solution containing 9% by weight of solids and containing the modified polyamide used in emulsion $A_1$ of Example 1. | 400 |
| A n-octylphenyl monoether of polyethylene glycol of average molecular weight 650, obtained from the reaction product of one mol of n-octylphenol with 10 mols of ethylene oxide | 13.5 |
| Water | 186.5 |

A concentrated emulsion $B_2$ is also used which is identical to $B_1$ except that the 400 g. of the aqueous solution of a modified polyamide containing 9% by weight of solids are replaced by 400 g. of a solution containing 10% by weight of solids obtained by diluting, with water, the aqueous solution stabilised by addition of formaldehyde and adjusted to pH 4, described in Example 1 of U.S. patent specification No. 3,227,671, which contains a polyamide prepared by reaction of diethylenetriamine with adipic acid and then modified with epichlorhydrin.

These emulsions are prepared by mixing, with stirring, the organosilicon polymers firstly with the 13.5 g. of the monoether, and then with the 186.5 g. of water, and thereafter emulsifying the whole by means of a colloid mill and adding 400 g. of a solution of a modified polyamide to the resulting emulsion for $B_1$ and $B_2$.

Treatment baths are then prepared, as described in Example 1, by mixing 50 g. of emulsion $B_1$ or $B_2$ with 940 g. of water and 10 g. of the catalyst emulsion C described in Example 1. Each of these baths contains 2% by weight of organosilicon polymers and 0.2% by weight of curable condensates.

For comparison, the following treatment baths are used:

(a) a treatment bath (a) prepared as described above but using an emulsion identical to $B_1$ except that the 400 g. of polyamide solution are replaced by 400 g. of water, or (b) a treatment bath (b) prepared as follows: 230 g. of a solution of a condensate the preparation of which is described below are mixed, with stirring, with 105 g. of a copolymer of methylhydrogenosiloxane and methylsiloxane having a viscoscity of 180 cps. at 20° and with 95 g. of trichloroethylene, 300 g. of water and 6 g. of acetic acid.

The precondensate solution was prepared by heating 100 g. of glycidyl ether of 4,4'-dihydroxy-diphenylpropane (epoxide number 0.43) with 50 g. of diethylenetriamine and 160 g. of methanol for 40 minutes at 50°, then adding 250 g. of 8.5% strength acetic acid, again heating to 65° for 25 minutes and thereafter adding 450 g. of 8.5% strength acetic acid whilst cooling. The resulting emulsion was diluted by adding water to yield a bath containing 2% by weight of organosilicon copolymers, or (c) a treatment bath containing, in addition to the organosilicon polymers, a polymer prepared by reaction of an epoxide resin with methyl-bis(3-aminopropyl) amine, prepared according to Example 1 of U.S. patent specification No. 3,211,580 and containing about 2% by weight of organosilicon copolymers.

A batch of cotton fabric is treated with baths (a), (b) or (c) or the baths obtained from emulsions $B_1$ or $B_2$ by the technique described in Example 1, to deposit 2 g. of organosilicon polymers per 100 g. of fabric. The treated fabric is tested by the procedures described in Example 1 and the results are given in Table II which shows that the baths in accordance with the present invention are superior to the comparison baths.

TABLE II

| Nature of the treatment baths | Results after— | | | | | | | | | | | |
|---|---|---|---|---|---|---|---|---|---|---|---|---|
| | Treatment | | | 1st wash | | | 2d wash | | | 3d wash | | |
| | | PO | | | PO | | | PO | | | PO | |
| | PL | a, percent | b | PL | a, percent | b | PL | a, percent | b | PL | a, percent | b |
| Containing emulsion: | | | | | | | | | | | | |
| $B_1$ | 100 | 33 | 0 | 90 | 52 | 0 | 70 | 66 | 0 | 65 | 75 | 0 |
| $B_2$ | 100 | 29 | 0 | 95 | 50 | 0 | 85 | 60 | 0 | 75 | 68 | 0 |
| Bath: | | | | | | | | | | | | |
| a | 100 | 46 | 0 | 80 | 62 | 0 | 70 | 92 | 10 | 50 | 101 | 24 |
| b | 95 | 68 | 0 | 80 | 86 | 0 | 70 | 100 | 1 | 50 | 125 | 13 |
| c | 100 | 45 | 0 | 70 | 76 | 2 | 60 | 106 | 6 | 50 | 121 | 21 |

I claim:

1. An aqueous emulsion containing 20 to 80% by weight water, and 80–20% by weight solids, the solids comprising a mixture of methylhydrogenopolysiloxane of the Formula I $$CH_3-\underset{R'}{\overset{R'}{Si}}O-\left[\underset{CH_3}{\overset{H}{Si}}O\right]_a-\left[\underset{CH_3}{\overset{CH_3}{Si}}O\right]_b-\underset{R'}{\overset{R'}{Si}}-CH_3 \quad (I)$$

in which the symbols R' each independently represents a methyl group or hydrogen, $a$ represents an integer from 3 to 600 and $b$ is zero or represents an integer from 1 to 200 and methylpolysiloxane of Formula II $$R''-\underset{CH_3}{\overset{CH_3}{Si}}O-\left[\underset{CH_3}{\overset{CH_3}{Si}}O\right]_c-\underset{CH_3}{\overset{CH_3}{Si}}R'' \quad (II)$$

or those having repeat units of Formula III

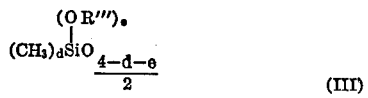
(III)

in which the symbols R'' each independently represent a methyl or hydroxy group; the symbols R''' each independently represent hydrogen or an alkyl radical having from 1 to 4 carbon atoms, $c$ represents an integer from 5 to 15000, $d$ equals 1, 2 or 3, the sum $d+e$ is between 1 and 3, and $e$ is zero or 1; the polymers of units of Formula III on average containing 1.2 to 1.9 methyl radicals and 0 to 0.3 OR''' groups per silicon atom, the polysiloxane mixture comprising 25 to 80% by weight of siloxane of Formula I and 75 to 20% by weight of siloxane of Formula II or III, 0.1 to 10% by weight, based on the weight of the polysiloxane mixture, of an emulsifier, and having, to render the emulsion storage-stable, 1.5 to 30% by weight, based on the weight of the polysiloxane mixture, of a curable water-soluble condensate which is a reaction product of;

(a) an aminated polymer consisting essentially of chains having repeat units of formula

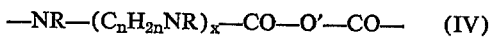     (IV)

in which R represents hydrogen or an alkyl group of 1 to 4 carbon atoms, $n$ is an integer of 2 to 10, $x$ is an integer of 1 to 7, the various symbols R of the groups $C_nH_{2n}NR$ can be identical or different if $x$ is greater than 1 and Q' represents an alkylene radical containing 2 to 8 carbon atoms, a cycloalkylene radical with 5 or 6 ring carbon atoms or a phenylene radical; and (b) a compound containing at least 1 halohydrin or epihalohydrin group

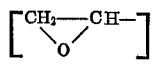

in an amount which is 0.5 to 1.8 mols per amino group per mol of the aminated polymer which converts all the secondary amine groups in polymer IV into tetrtiary amine groups and all tertiary amine groups in polymer IV into quaternary ammonium groups.

2. An emulsion according to claim 1, in which the aminated polymer is obtained by reaction of an organic diacid with apolyalkylene-polyamine containing two primary amino groups and at least one secondary amino group.

3. An emulsion according to claim 1 wherein the curable water-soluble condensate is a reaction product of the aminated polymer IV and epichlorhydrin.

4. An emulsion as claimed in claim 1 containing 5-15% by weight, based on the weight of the polysiloxane mixture, of the curable water-soluble condensate.

5. An emuslion as claimed in claim 1 wherein the polysiloxane mixture comprises 25-80% by weight of the methylhydrogenopolysiloxane and 75-20% by weight of methylpolysiloxane.

6. A process for producing a storage-stable aqueous emulsion which comipirses emulsifying an aqueous mixture of methylhydrogenopolysiloxane of the Formula I

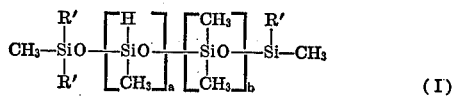
(I)

in which the symbols $R_2$ each independently represent a methyl group or hydrogen, $a$ represents an integer from 3 to 600 and $b$ is zero or represents an integer from 1 to 200, and methylpolysiloxane of Formula II

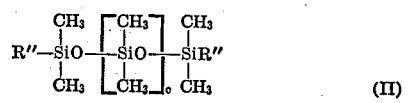
(II)

or those having repeat units of Formula III

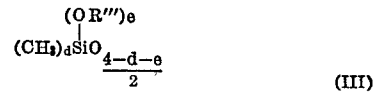
(III)

in which the symbols R'' each independently represent a methyl or hydroxy group; the symbols R''' each independently represent hydrogen or an alkyl radical having from 1 to 4 carbon atoms, $c$ represents an integer from 5 to 15000, $d$ equals 1, 2 or 3, the sum $d+e$ is between 1 and 3, and $e$ is zero or 1; the polymers of units of Formula III on average containing 1.2 to 1.9 methyl radicals and 0 to 0.3 OR''' groups per silicon atoms, containing 20 to 80% by weight of water and 80 to 20% by weight solids, the polysiloxane mixture comprising 25 to 80% by weight of siloxane of Formula I and 75 to 20% by weight of siloxane of Formula II or III and containing 0.1 to 10% by weight of an emulsifier, based on the weight of the polysiloxane mixture, and then introducing into the emulsion a sufficient amount of an aqueous solution of a curable water-soluble condensate which is a reaction product of:

(a) an aminated polymer consisting essentially of chains having repeat units of formula:

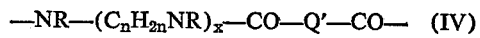     (IV)

in which R represents hydrogen or an alkyl group of 1 to 4 carbon atoms, $n$ is an integer of 2 to 10, $x$ is an integer of 1 to 7, the various symbols R of the groups $C_nH_{2n}NR$ can be identical or different if $x$ is greater than 1 and Q' represents an alkylene radical containing 2 to 8 carbon atoms, cycloalkylene radical with 5 or 6 ring carbon atoms or a phenylene radical; and (b) a compound containing at least 1 halohydrin or epihalohydrin group

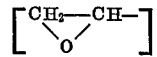

in an amount which is 0.5 to 1.8 mols per amino group per mol of the aminated polymer which converts all the secondary amine groups in polymer IV into tertiary amine groups and all tertiary amine groups in polymer IV into quaternary ammonium groups, so that the resultant product contains 1.5 to 30% by weight of the curable water-soluble condensate based on the weight of the polysiloxane mixture.

7. An aqueous medium for waterproofing textile materials comprising 0.7 to 5% by weight of a mixture of methylhydrogenopolysiloxane of the Formula I

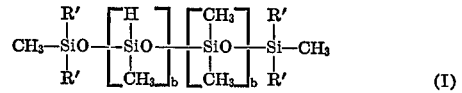
(I)

in which the symbols R' each independently represents a methyl group or hydrogen, $a$ represents an integer from 3 to 600 and $b$ is zero or represents an integer from 1 to 200 and methylpolysiloxane of Formula II

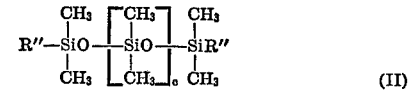
(II)

or those having repeat units of Formula III

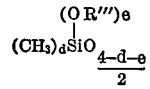
(III)

in which the symbols R'' each independently represent a methyl or hydroxy group; the symbols R''' each independently represent hydrogen or an alkyl radical having from 1 to 4 carbon atoms, $c$ represents an integer from 5 to 15000, $d$ equals 1, 2 or 3, the sum $d+e$ is between 1 and 3, and $e$ is zero or 1; the polymer of units of Formula III on average containing 1.2 to 1.9 methyl radicals and 0 to 0.3 OR''' groups per silicon atom, based on the weight of the medium, the polysiloxane comprising 25 to 80% by weight of siloxane of Formula I and 75 to 20% by weight of siloxane of Formula II or III, 0.1 to 10% by weight of an emulsifier based on the weight of the polysiloxane mixture, 0.01 to 0.7% by weight, based on the weight of the medium, of a curable water-soluble condensate which is a reaction product of:

(a) an aminated polymer consisting essentially of chains having repeat units of formula:

$$-NR-(C_nH_{2n}NR)_x-CO-Q'-CO-\quad (IV)$$

in which R represents hydrogen or an alkyl group of 1 to 4 carbon atoms, $n$ is an integer of 2 to 10, $x$ is an integer of 1 to 7, the various symbols R of the groups $C_nH_{2n}NR$ can be identical or different if $x$ is greater than 1 and Q' represents an alkylene radical containing 2 to 8 carbon atoms, a cycloalkylene radical with 5 or 6 ring carbon atoms or a phenylene radical; and (b) a compound containing at least 1 halohydrin or epihalohydrin group

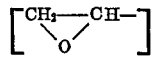

in an amount which is 0.5 to 1.8 mols per amino group per mol of the aminated polymer which converts all the secondary amine groups in polymer IV into tertiary amine groups and all tertiary amine groups in polymer IV into quaternary ammonium groups, and 5 to 20% by weight, of at least one metal containing salt of a carboxylic acid or a metal alkyl.

8. An aqueous medium according to claim 7 in which the aminated polymer is obtained by reaction of an organic diacid with a polyalkylene-polyamine containing two primary amino groups and at least one secondary amino group.

9. An aqueous medium according to claim 7 wherein the curable water-soluble condensate is a reaction product of the aminated polymer IV and epichlorhydrin.

10. An aqueous medium according to claim 7 wherein the organometallic salt and/or metal salt of the carboxylic acid is a mixture of zinc 2-ethyl-hexanoate and n-dibutyltin di-(2-ethyl-hexanoate).

References Cited
UNITED STATES PATENTS

| | | | |
|---|---|---|---|
| 3,240,761 | 3/1966 | Keimetal | 260—78 |
| 3,251,794 | 5/1966 | Paliyenko et al. | 260—29.2 M |
| 2,588,393 | 3/1952 | Kauppi | 260—825 X |
| 2,983,700 | 5/1961 | Rohm | 260—824 R |
| 3,150,116 | 9/1964 | Masters | 260—824 EP X |
| 3,296,153 | 1/1967 | Snogren | 260—824 EP |
| 3,457,323 | 7/1969 | Stengle, Jr. | 260—826 |

JOSEPH L. SCHOFER, Primary Examiner

J. B. EVANS, Assistant Examiner

U.S. Cl. X.R.

117—32 BE, 132 BS, 138.5, 139.5 CG, 161; 260—29.6 T, 29.6 TA, 46.5, 80.5, 824 EP, 825; 252—8.6, 8.8, 8.9